US010905282B2

(12) United States Patent
Mansueto et al.

(10) Patent No.: US 10,905,282 B2
(45) Date of Patent: Feb. 2, 2021

(54) BARBECUE WITH SPIT FUNCTIONALITY

(71) Applicant: Shriro Australia Pty Limited, Kingsgrove (AU)

(72) Inventors: David Mansueto, Rose Bay (AU); David Jones, Beecroft (AU); Anson Li, Rhodes (AU)

(73) Assignee: Shriro Australia Pty Limited, Kingsgrove (AU)

( * ) Notice: Subject to any disclaimer, the term of this patent is extended or adjusted under 35 U.S.C. 154(b) by 195 days.

(21) Appl. No.: 15/763,173

(22) PCT Filed: Oct. 13, 2016

(86) PCT No.: PCT/AU2016/000345
§ 371 (c)(1),
(2) Date: Mar. 26, 2018

(87) PCT Pub. No.: WO2017/063019
PCT Pub. Date: Apr. 20, 2017

(65) Prior Publication Data
US 2018/0263414 A1 Sep. 20, 2018

(30) Foreign Application Priority Data

Oct. 14, 2015 (AU) ................ 2015904181

(51) Int. Cl.
*A47J 37/07* (2006.01)
*A47J 37/04* (2006.01)

(52) U.S. Cl.
CPC ......... *A47J 37/0704* (2013.01); *A47J 37/041* (2013.01)

(58) Field of Classification Search
CPC ............... A47J 37/0704; A47J 37/041
See application file for complete search history.

(56) References Cited

U.S. PATENT DOCUMENTS 2,588,046 A * 3/1952 Ridgely ............... A47J 37/041
99/421 HV
2,718,845 A * 9/1955 Dudley ............... A47J 37/0731
99/421 HH (Continued)

FOREIGN PATENT DOCUMENTS

AU 2008350879 B2 8/2009
BR MU8802810-0 U2 9/2010

(Continued)

OTHER PUBLICATIONS

English-language machine translation of FR 2298301 A, European Patent Office, Aug. 20, 1976.

(Continued)

*Primary Examiner* — Bayan Salone
(74) *Attorney, Agent, or Firm* — Dascenzo Gates Intellectual Property Law, P.C.

(57) ABSTRACT

A barbecue (20) with spit functionality, the barbecue (20) including: a barbecue body (22) having a first opening (28) and a second opening (30); a first spit support member (24) mounted in the first opening (28) and settable at a storage position, in which the first spit support member (24) is substantially contained within the barbecue body (22), or one or more use positions, in which the first spit support member (24) at least partially protrudes from the barbecue body (22); a second spit support member (26) mounted in the second opening (30) and settable at a storage position, in which the second spit support member (26) is substantially contained within the barbecue body (22), or one or more use positions, in which the second spit support member (26) at least partially protrudes from the barbecue body (22); and a spit rod (34) releasably engageable with the first and second spit support members (24 and 26) when the first and second (Continued)

spit support members (24 and 26) are in their respective use positions.

9 Claims, 8 Drawing Sheets

(56) References Cited

U.S. PATENT DOCUMENTS

| | | | | |
|---|---|---|---|---|
| 3,269,299 | A * | 8/1966 | Nielsen | A47J 37/041 99/421 H |
| 3,442,201 | A * | 5/1969 | Kates | A47J 37/0745 99/421 R |
| 3,733,999 | A * | 5/1973 | Bernstein | A47J 37/041 99/337 |
| 3,943,837 | A * | 3/1976 | Trkla | A47J 37/0704 99/339 |
| 4,112,832 | A * | 9/1978 | Severdia | A47J 37/041 185/38 |
| 4,469,019 | A * | 9/1984 | Baer | A47J 37/0745 126/25 AA |
| 5,410,950 | A * | 5/1995 | Rone | A47J 37/041 126/25 AA |
| 5,934,180 | A * | 8/1999 | Lin | A47J 37/0745 219/386 |
| 6,131,505 | A * | 10/2000 | Lin | A47J 37/041 403/386 |
| 6,330,853 | B1 * | 12/2001 | Yu | A47J 37/041 99/419 |
| 6,792,935 | B2 | 9/2004 | Williams et al. | |
| 7,856,924 | B1 * | 12/2010 | Stihi | A47J 37/0731 99/419 |
| 8,051,768 | B2 * | 11/2011 | Stephen | A47J 37/041 99/421 H |
| 9,775,464 | B2 * | 10/2017 | Gillespie | A47J 37/075 |
| 2006/0266228 | A1 * | 11/2006 | Ritterling | A47J 37/067 99/450 |
| 2008/0229937 | A1 * | 9/2008 | Stephen | A47J 37/07 99/421 R |
| 2013/0133527 | A1 * | 5/2013 | Martin | A47J 37/041 99/444 |
| 2014/0069412 | A1 * | 3/2014 | Garman | B23P 19/00 126/25 R |
| 2014/0208960 | A1 | 7/2014 | Gillespie et al. | |

FOREIGN PATENT DOCUMENTS

| | | |
|---|---|---|
| BR | 202016027468 U2 | 6/2018 |
| CA | 2153115 A1 | 12/1996 |
| CN | 1466429 A | 1/2004 |
| CN | 101422328 A | 5/2009 |
| CN | 104720620 A | 6/2015 |
| CN | 104856583 A | 8/2015 |
| CN | 205433418 U | 8/2016 |
| DE | 202008011643 U1 | 5/2009 |
| FR | 2298301 A | 8/1976 |
| FR | 2479676 A | 10/1981 |
| FR | 2759888 A1 | 8/1998 |
| GB | 2146235 A | 4/1985 |
| GB | 2373173 A | 9/2002 |
| WO | WO 2009/105111 A1 | 8/2009 |

OTHER PUBLICATIONS

English-language machine translation of FR 2479676 A, European Patent Office, Oct. 9, 1981.
English-language machine translation of FR 2759888 A1, European Patent Office, Aug. 28, 1998.
English-language machine translation of DE 202008011643 U1, European Patent Office, May 14, 2009.
English-language machine translation of CN 205433418 U, Clarivate Analytics, Aug. 10, 2016.
English-language machine translation of BR 202016027468 U2, Google Patents, Jun. 12, 2018.
Examination Report No. 1 issued in connection with Australia Patent Application No. 2018100790, IP Australia, dated Aug. 31, 2018.
Examination Report No. 1 issued in connection with Australia Patent Application No. 2018100792, IP Australia, dated Sep. 6, 2018.
Notification of Material Filed by a Third Party, submitted in connection with Australia Patent Application No. 2018100790, Aug. 14, 2018.
Notification of Material Filed by a Third Party, submitted in connection with Australia Patent Application No. 2018100792, Aug. 10, 2018.
Statement of Grounds and Particulars, submitted in connection with opposition against Australia Patent No. 2018100790, Nov. 11, 2019.
Declaration of David Trought and Exhibits DT-1 to DT-10, submitted in connection with opposition against Australia Patent No. 2018100790, Nov. 11, 2019.
Declaration of Mathew Trainor and Exhibits MT-1 to MT-7, submitted in connection with opposition against Australia Patent No. 2018100790, Nov. 11, 2019.
English-language machine translation of China Patent Publication No. CN 1466429 A, Google Patents, Jan. 7, 2004.
English-language machine translation of China Patent Publication No. CN 101422328 A, Google Patents, May 6, 2009.
English-language machine translation of Brazil Utility Model No. MU8802810-0 U2, Google Patents, Sep. 21, 2010.
English-language machine translation of China Patent Publication No. CN 104856583 A, Google Patents, Aug. 26, 2015.
English-language machine translation of China Patent Publication No. CN 104720620 A, Google Patents, Jun. 24, 2015.

* cited by examiner

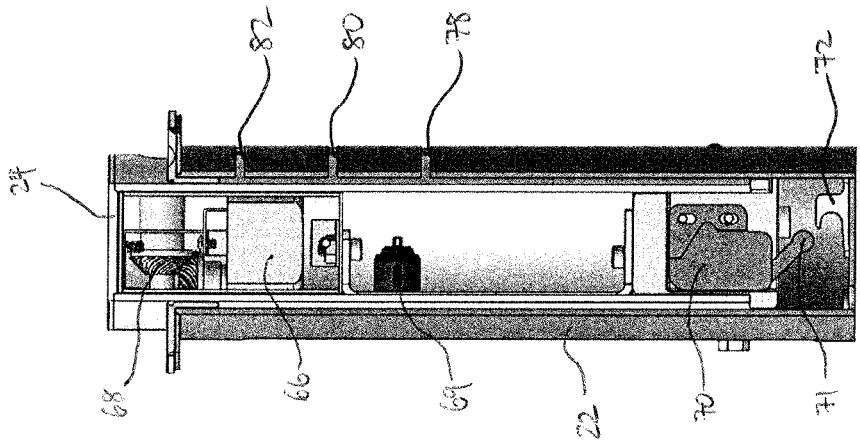
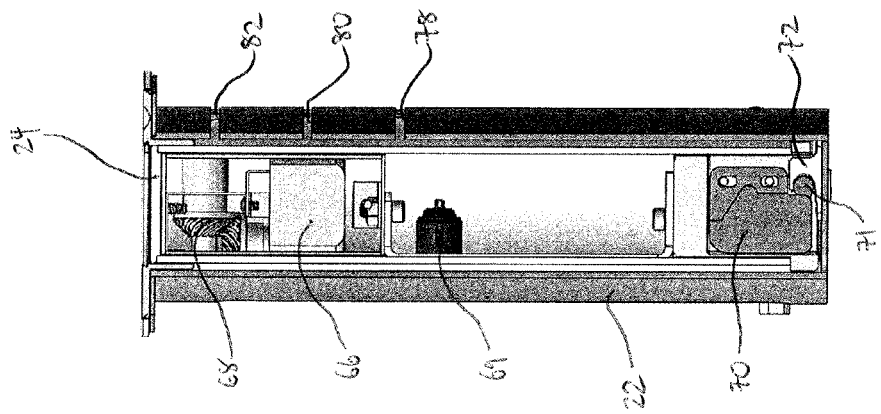
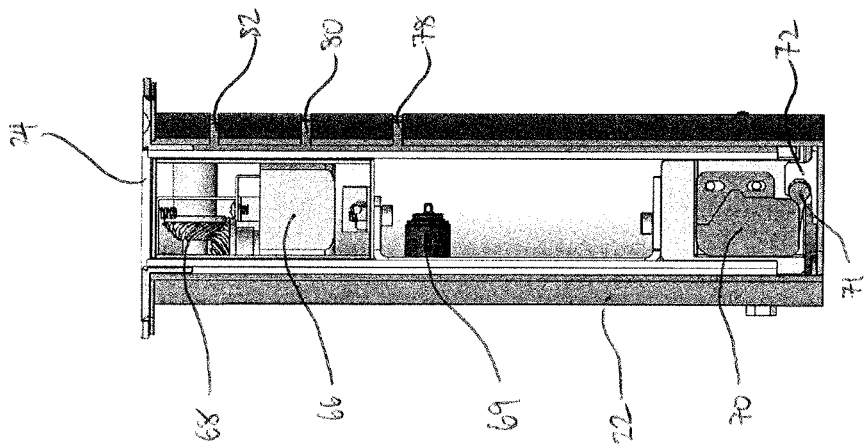

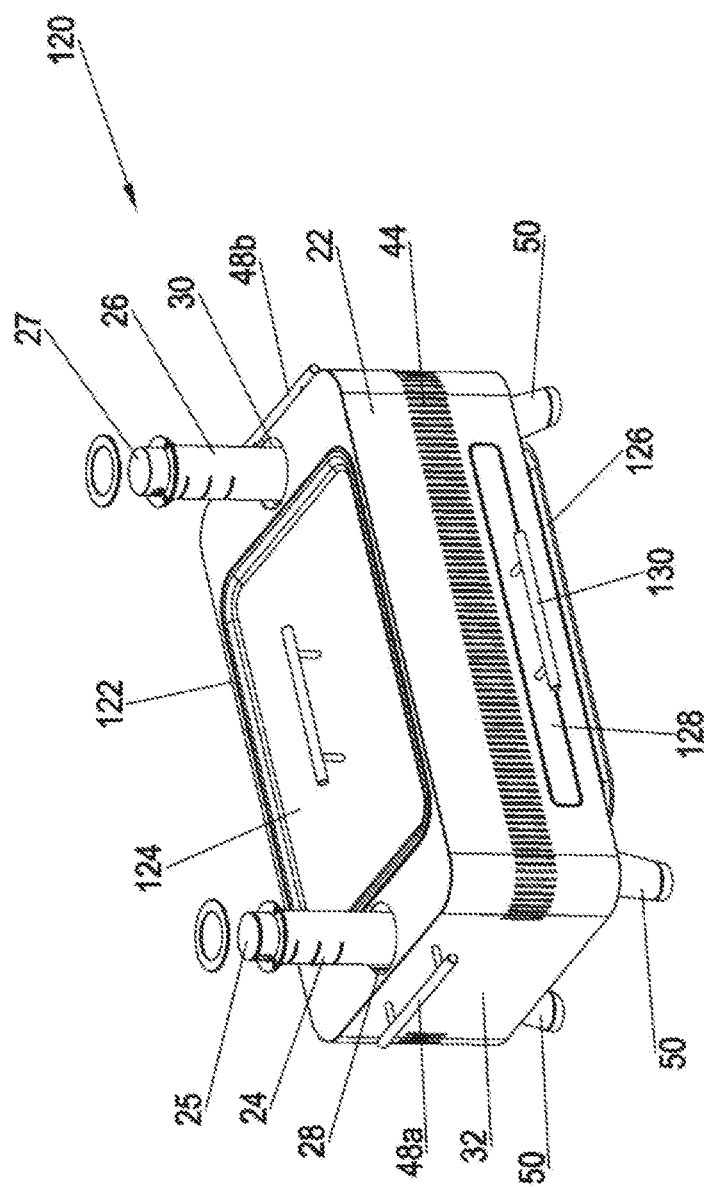

BARBECUE WITH SPIT FUNCTIONALITY

FIELD

The present invention relates to a barbecue.

The invention has been developed for use with a barbecue that has a spit functionality, and will be described hereinafter with reference to this application.

BACKGROUND OF THE INVENTION

Barbecue spits, or rotisseries, are known. They are used to cook whole or large portions of various meats. Known barbecue spits typically comprise a large rectangular container that holds charcoal or firewood, a pair of vertical supports fixed to either end of the body and a spit rod that is mounted across the vertical supports. The spit rod, which holds the meat, is rotated over the hot charcoals, thus allowing the meat to cook evenly. Rotation of the spit rod is typically driven by a motor.

A disadvantage of known barbecue spits is that they are typically bulky in size and have a number of components that require manual assembly prior to use. Also, keeping known barbecue spits assembled in a "ready to use" state is impractical and/or difficult due to their bulky size. Further, the disparate sizes and multitude of the various components makes the assembly of the barbecue spit difficult and time consuming. The process of dismantling and storing the barbecue spit, after it has been used, also requires a substantial amount of time and effort.

OBJECT OF THE INVENTION

It is an object of the present invention to substantially overcome one or more of the above disadvantages.

SUMMARY OF THE INVENTION

Accordingly, the present invention provides a barbecue with spit functionality, the barbecue including:

a barbecue body having a first opening and a second opening;

a first spit support member mounted in the first opening and settable at a storage position, in which the first spit support member is substantially contained within the barbecue body, or one or more use positions, in which the first spit support member at least partially protrudes from the barbecue body;

a second spit support member mounted in the second opening and settable at a storage position, in which the second spit support member is substantially contained within the barbecue body, or one or more use positions, in which the second spit support member at least partially protrudes from the barbecue body; and a spit rod releasably engageable with the first and second spit support members when the first and second spit support members are in their respective use positions.

The barbecue body preferably includes a top surface, the first support member includes a top surface, and the second support member includes a top surface, the top surfaces of the first and second support members being flush with the top surface of the barbecue body when the first and second support members are in their respective storage positions.

The barbecue preferably further includes a first latch spring located within the first opening, and a second latch spring located within the second opening, the first and second latch springs adapted to facilitate movement of the first and second spit support members between their respective storage and use positions.

The first and second spit support members are preferably settable at three use positions, in which they partially protrude from the barbecue body by three varying amounts respectively.

The barbecue according to any one of the preceding claims, wherein the barbecue body includes a storage compartment.

The barbecue body preferably includes one or more storage doors to provide access to the storage compartment.

The barbecue body preferably includes a grill area adapted to receive charcoal or firewood.

The grill area preferably includes a gill interior and a grill rack.

The barbecue body preferably includes a plurality of ventilation slots.

The barbecue preferably further includes a plurality of legs to support the barbecue body.

BRIEF DESCRIPTION OF DRAWINGS

Preferred embodiments of the invention will now be described, by way of examples only, with reference to the accompanying drawings in which:

FIGS. 3A to 3C are front cross-sectional views of the first spit support member of the barbecue shown in FIG. 1, in storage positions;

FIG. 6 is a perspective view of a second embodiment of a barbecue with spit functionality, in a use configuration;

DESCRIPTION OF EMBODIMENTS

Figure 1:
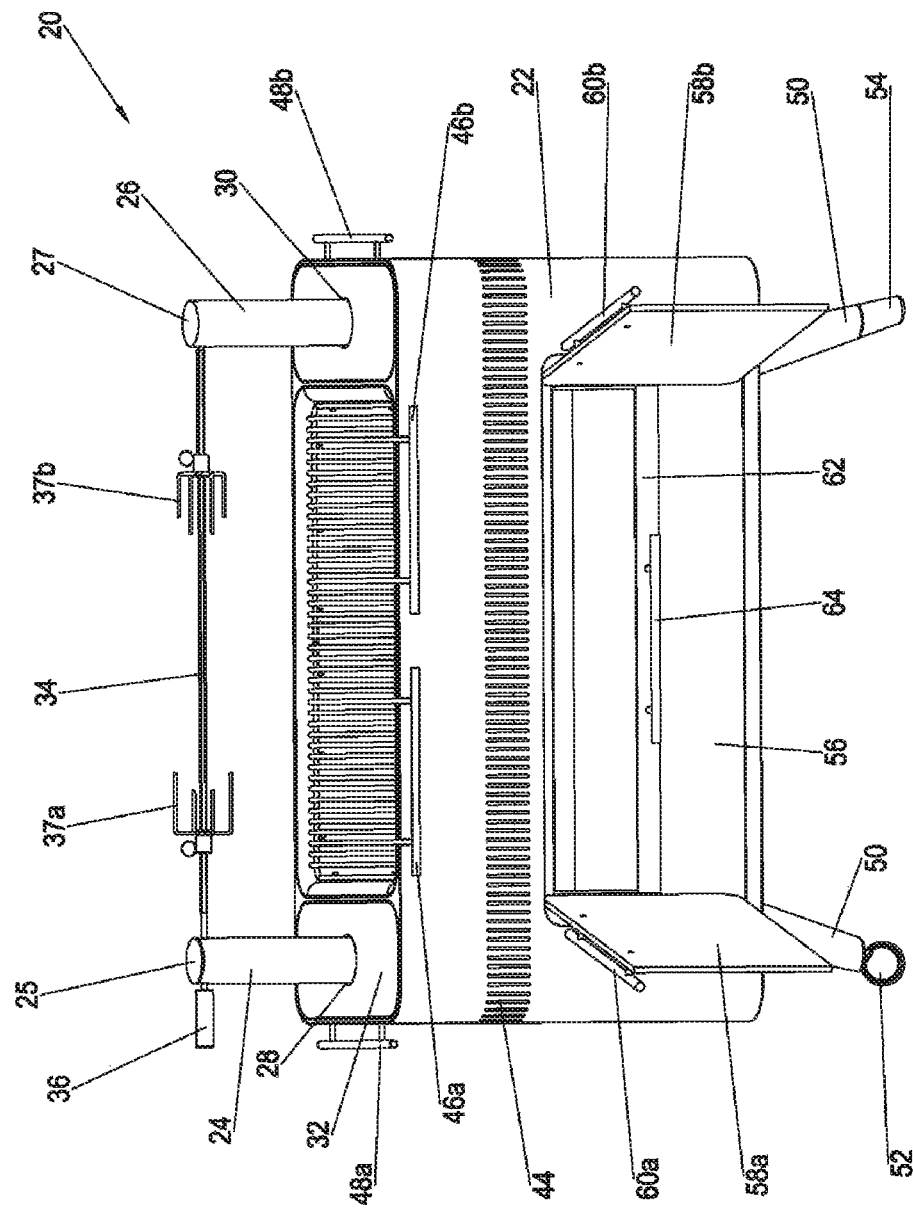
FIG. 1 is a front perspective view of a first embodiment of a barbecue with spit functionality, in a use configuration.

FIG. 1 shows a first embodiment of a barbecue 20 with spit functionality. The barbecue 20 is in a free-standing form and includes a barbecue body 22, a first spit support member 24 and a second spit support member 26. The barbecue body 22 has a height of approximately 640 mm, a length of approximately 1265 mm, and a width of approximately 500 mm. The barbecue body 22 has a first opening 28, a second opening 30 and a top surface 32. The first spit support member 24 is mounted in the first opening 28 and the second spit support member 26 is mounted in the second opening 30. The first and second spit support members 24 and 26 include top surfaces 25 and 27, respectively.

As can be seen in FIGS. 3A to 3C, the first spit support member 24 has a hollow body, which houses a motor 66, a gear drive 68 and a power button 69. The gear drive 68 includes a square socket opening therein. The first spit support member 24 also includes a latch mechanism located at a lower portion of the first spit support member 24. The latch mechanism includes a double acting latch 70 with a spring-loaded arm 71. The barbecue body 22 includes a catch 72 within the first opening 28. The second spit support member 26 includes a similar latch mechanism. The second spit support member 26 also has a hollow body, which houses an injection moulded plastic cradle support therein.

Figure 4A:
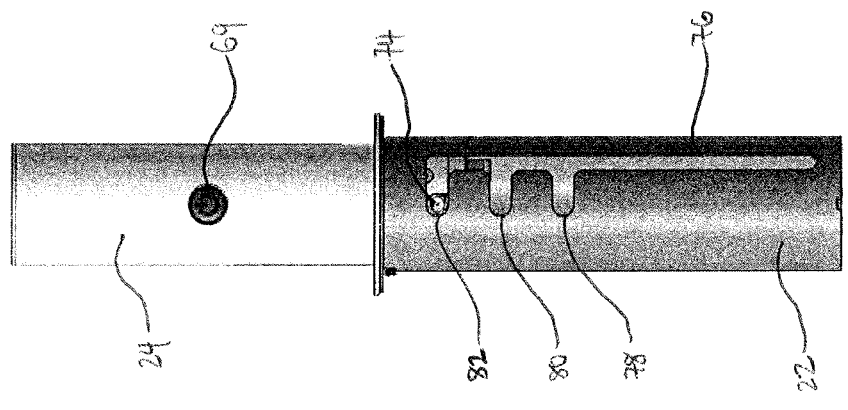
FIGS. 4A and 4B are front views of the first spit support member of the barbecue shown in FIG. 1, in use positions.
Figure 4B:
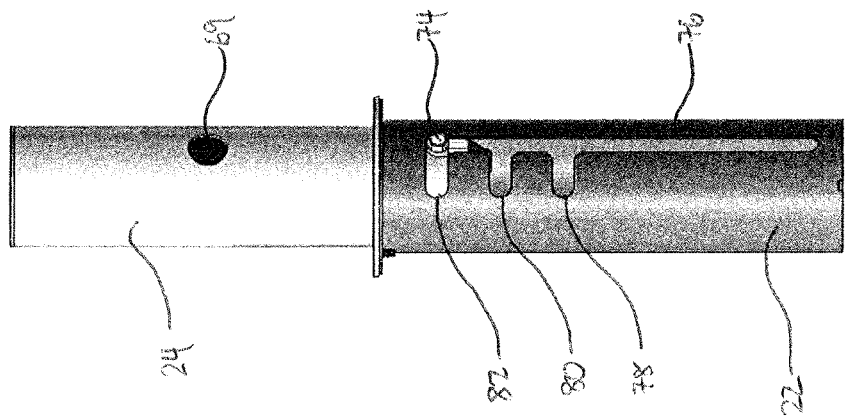

Referring to FIGS. 4A and 4B, the first support member 24 further includes a knob 74. The barbecue body 22 includes a vertical track 76, and three horizontal tracks 78, 80 and 82 within the opening 28. The knob 74 is adapted to slide along the tracks 76, 78, 80 and 82. The second support member 26 includes identical components.

Returning to FIG. 1, the barbecue 20 also includes a spit rod 34, of square cross-section, which is mounted on the first and spit second support members 24 and 26. The spit rod 34 includes a handle 36 and spit forks 37a and 37b. The barbecue body 22 includes a grill area 38 having a grill interior 40 and a grill rack 42. The barbecue body 22 further includes a plurality of ventilation slots 44, front handles 46a and 46b, side handles 48a and 48b, and legs 50. The legs 50 include castor wheels 52 on one side of the barbecue body 22, and rubber heels 54 on the other side of the barbecue body 22. The legs 50 have a height of approximately 260 mm.

The barbecue body 22 further includes a storage compartment 56. Storage doors 58a and 58b provide access to the storage compartment 56 and include door handles 60a and 60b. The barbecue body 22 further includes a drip tray 62 that is mounted within the storage compartment 52. The drip tray 62 includes a tray handle 64.

The functionality of the barbecue 20 will now be described.

FIG. 1 shows the barbecue 20 in a use configuration. The first and second support members 24 and 26 are in their respective use positions, in which they protrude from the barbecue body 22. The spit rod 34 is mounted and secured to an upper portion of the first and second spit support members 24 and 26 with one end engaged with the square socket opening in the first support member 24 and the other end engaged in the plastic cradle support in the second support member 26. The positions of the spit forks 37a and 37b are adjustable along the length of the spit rod 34 so as to secure different types and sizes of meat. The grill area 38 is located below the spit rod 34. The grill interior 40 is adapted to receive charcoal or firewood to cook the meat on the spit rod 34, and the grill rack 42 prevents any excess meat falling off the spit rod 34 from entering the grill interior 40. The grill rack 42 can also be used to cook smaller portions of meat separate from the spit rod 34. The ventilation slots 44 allow for ventilation of air in and out of the barbecue body 22 to facilitate the burning of the charcoal or firewood in the grill interior 40.

The storage compartment 56 can be used to store the spit rod 34 and/or other barbecue accessories, and is accessible from the front of the barbecue 22 via the storage doors 58a and 58b. The drip tray 62 holds any oils or fats that drip from the meat being cooked on the spit rod 34.

Figure 2:
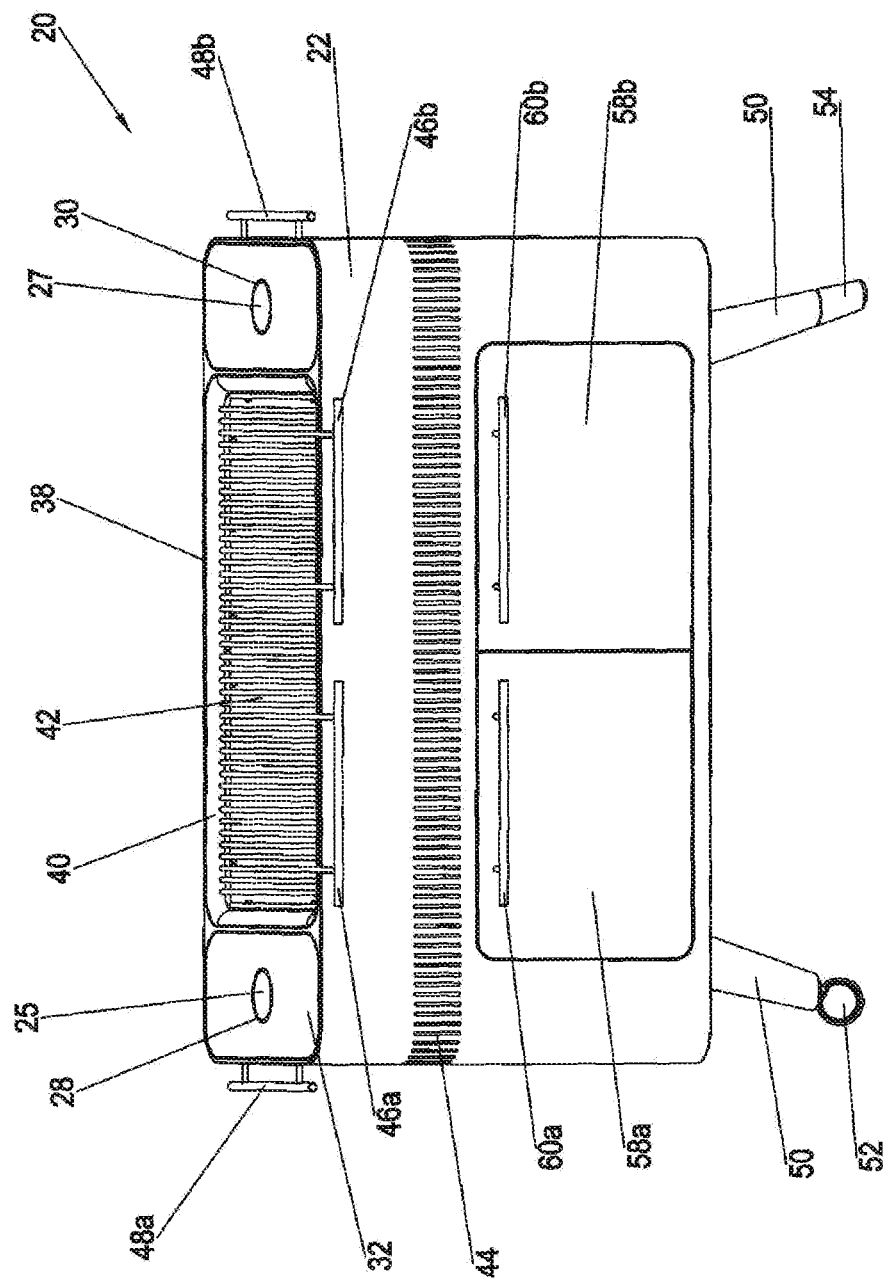
FIG. 2 is a front perspective view of the barbecue shown in FIG. 1, in a storage configuration.

FIG. 2 shows the barbecue 20 in a storage configuration. In this configuration, the first and second spit support members 24 and 26 are in their respective storage positions, in which they are substantially contained within the barbecue body 22. Further, the top surfaces 25 and 27 of the first and second spit support members 24 and 26 are flush with the top surface 32 of the barbecue body 22. The storage doors 50a and 50b are shut to securely contain the spit rod 34, drip tray 54 and other accessories within the storage compartment 48.

As will be described in more detail below, the first and second spit support members 24 and 26 are moveable between their respective use and storage positions, thereby allowing the barbecue 20 to be in either of the use or storage configurations described above. Additionally, the first and second spit support members 24 and 26 can be positioned relative to the barbecue body 22 at three locations along their respective lengths so as to define three different spit roasting heights. The movement of the first and second spit support members 24 and 26 is facilitated by the latch mechanism located within their respective first and second openings 28 and 30.

FIGS. 3A to 3C show the operation of the latch mechanism of the first support member 24. In FIG. 3A, the first support member 24 is held in the storage position by the spring-loaded arm 71 of the double acting latch 70 engaging the catch 72 of the barbecue body 22. As shown in FIG. 3B, applying a downward force on the first support member 24 releases the spring-loaded arm 71 from the catch 72. This causes the first support member 24 to pop-up from the barbecue body 22 into a grippable position, as shown in FIG. 3C. In this grippable position, the first support member 24 protrudes from the barbecue body 22 by approximately 13 mm, which allows the user to grip the first support member 24 and pull it upwards into a use position.

FIGS. 4A and 4B show the interaction between the knob 74 of the first support member 24 and the vertical and horizontal tracks 76 and 82 of the barbecue body 22. Pulling the first support member 24 upwards into the use position causes the knob 74 to slide upwards along the vertical track 76. Once the knob 74 is in a position adjacent the horizontal track 82, the user applies ⅛th of a turn to the first support member 24, which causes the knob 74 to slide into the horizontal track 82. This sets the first support member 24 at one of three spit roasting heights. Similarly, the first support member 24 can be set at either of the other two spit roasting heights by sliding the knob 74 into horizontal tracks 78 or 80, respectively. The operation and movement of the second spit support member 26 are similar to the first spit support member 24.

Figure 5C:
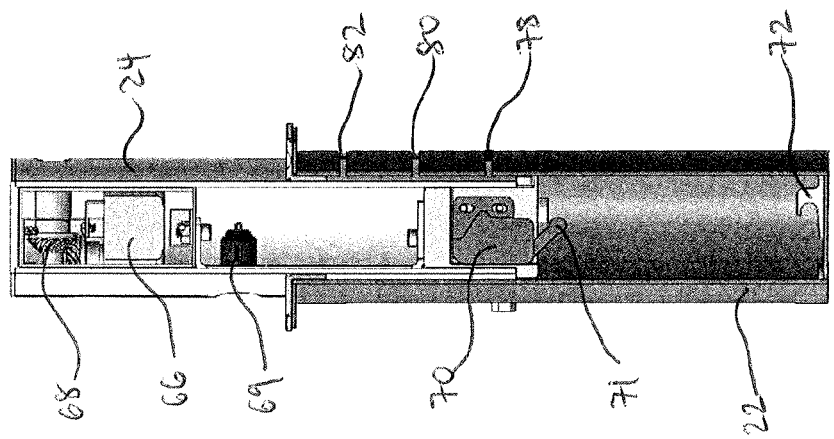
FIGS. 5A to 5C are front cross-sectional views of the first spit support member of the barbecue shown in FIG. 1, in use positions.
Figure 5B:
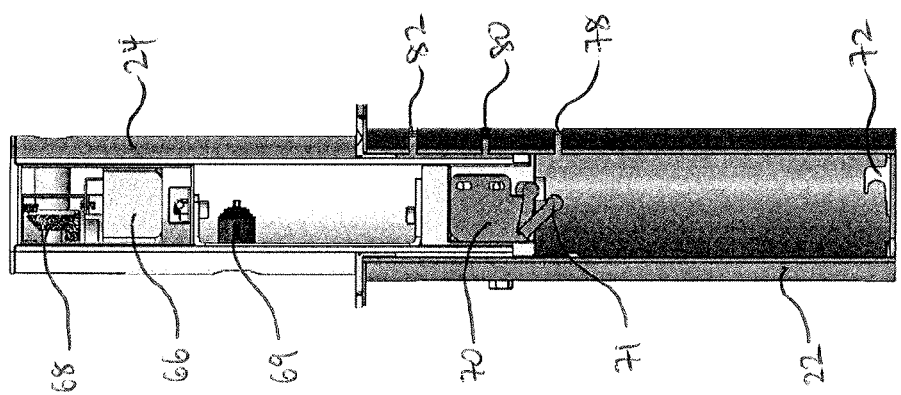
Figure 5A:
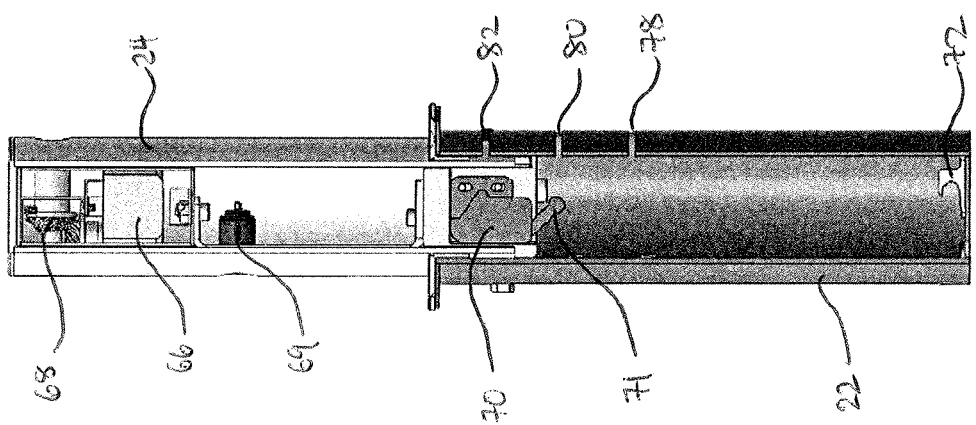

FIGS. 5A to 5C show the first support member 24 set at the three different spit roasting heights, in which the knob 74 is positioned in horizontal tracks 82, 80 and 78, respectively.

The user sets the first and second support members 24 and 26 at a desired spit roasting height. The meat to be cooked is then attached to the spit rod 34. The spit forks 37a and 37b are adjusted along the length of the spit rod 34 to secure the meat therebetween. The spit rod 34 is then mounted and secured to the first and second support members 24 and 26. The user then presses the power button 69 to energise the motor 66 and the gear drive 68. The spit rod 34 then rotates over the charcoal or firewood in the grill area 38, allowing the meat to be cooked evenly.

FIG. 6 shows a second embodiment of a barbecue 120 with spit functionality, in a use configuration. The barbecue 120 is in a table-top form and is somewhat similar to the barbecue 20, with like reference numerals being used to indicate like features. However, the barbecue body 22 has a height between about 200 to 225 mm, a length of approximately 840 mm, and a width of approximately 460 mm. The legs 50 have a height of approximately 80 mm. The barbecue body 22 includes a smaller grill area 122 instead of the grill area 38. The grill area 122 includes a grill lid 124. The barbecue body 22 also includes a grill lid storage area 126 located below the barbecue body 22. The storage compartment 56 is accessible by way of a storage drawer 128, which includes a drawer handle 130.

Figure 7:
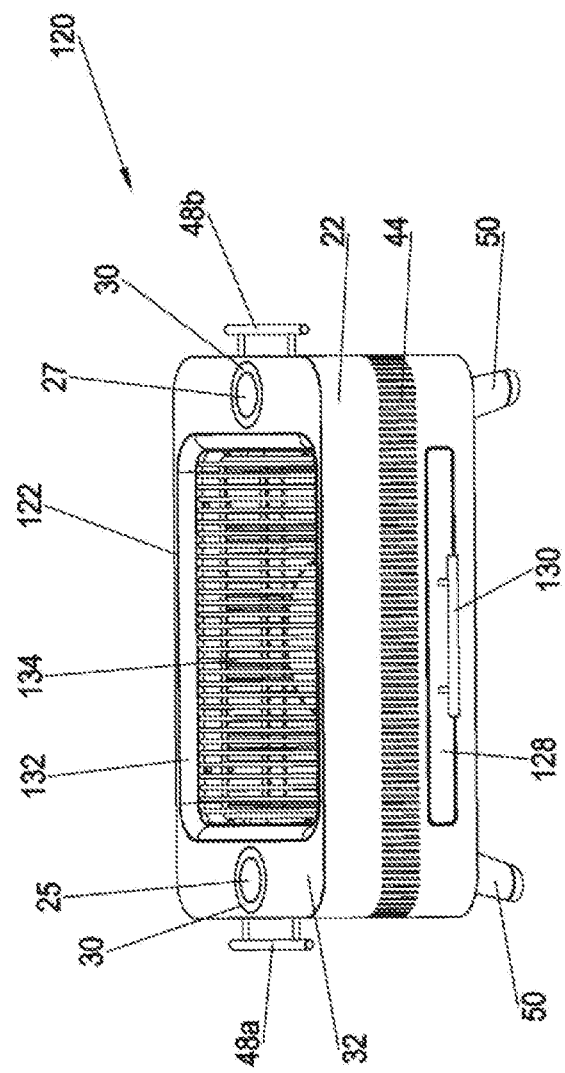
FIG. 7 is a perspective view of the barbecue shown in FIG. 3, in a storage configuration

FIG. 7 shows the barbecue 120 in a storage configuration. The grill area 122 includes a table-top grill interior 132 and a table-top grill rack 134.

Figure 8:
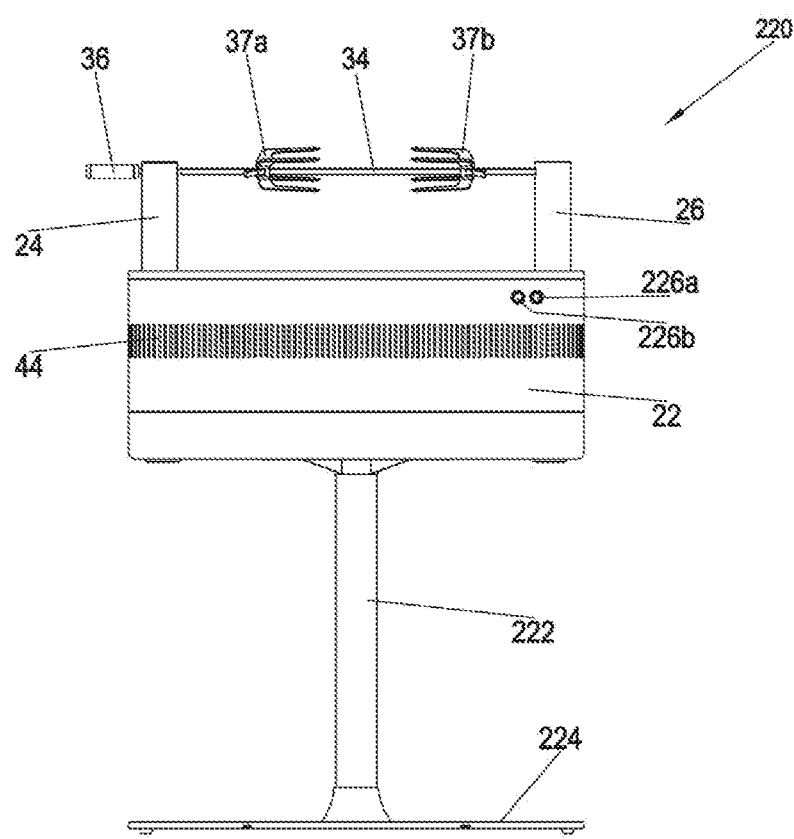
FIG. 8 is a side view of a third embodiment of a barbecue with spit functionality, in a use configuration.

FIG. 8 shows a third embodiment of a barbecue 220 with spit functionality, in a use configuration. The barbecue 220 is substantially identical to the table-top form of the barbecue 120, with like reference numerals being used to indicate like features. However, the barbecue 220 includes a pedestal stand 222 to support and elevate the barbecue body 22 from the ground. The pedestal stand 222 includes a base 224. In this embodiment, the pedestal stand 222 has a height of approximately 592 mm, whilst the barbecue body 22 has a height of approximately 232 mm, a length of approximately 730 mm and a width of approximately 410 mm. The barbecue 220 also includes power buttons 226a, 226b located on a side surface of the barbecue body 22.

The barbecues described above have a number of advantages. Firstly, when the barbecues are in their storage configurations, their various components are stored away inside the barbecue body itself. This provides for a smaller, less bulky, and more visually appealing form of a spit barbecue, which can also be used as an outdoor table for serving food and drinks. Additionally, the various barbecue components are maintained in a "ready to use" state, and can thus easily be assembled, which reduces the time and effort that is normally required to set up a spit barbecue. When the barbecues are in their use configurations, the spit support members and spit forks are adjustable to different heights and lengths to suit the type and size of meat that is being cooked. The barbecue body also has handles and legs fitted with wheels, which allows a user to easily transport the barbecue from one location to another.

Although the invention has been described with reference to preferred embodiments, it will be appreciated by persons skilled in the art that the invention may be embodied in many other forms. For example, in another embodiment (not shown) the barbecue body has a height of approximately 400 mm, a length of approximately 1545 mm, and a width of 500 mm.

The invention claimed is:

1. A barbecue with spit functionality, the barbecue including:
   a barbecue body having a first opening and a second opening;
   a first spit support member mounted in the first opening and settable at a storage position, in which the first spit support member is substantially contained within the barbecue body, or one or more use positions, in which the first spit support member at least partially protrudes from the barbecue body;
   a second spit support member mounted in the second opening and settable at a storage position, in which the second spit support member is substantially contained within the barbecue body, or one or more use positions, in which the second spit support member at least partially protrudes from the barbecue body; and
   a spit rod releasably engageable with the first and second spit support members when the first and second spit support members are in their respective use positions,
   wherein the barbecue body includes a horizontal top surface, the first support member includes a top surface, and the second support member includes a top surface, the top surfaces of the first and second support members being flush with the horizontal top surface of the barbecue body when the first and second support members are in their respective storage positions.

2. The barbecue in accordance with claim 1, further including a first latch spring located within the first opening, and a second latch spring located within the second opening, the first and second latch springs adapted to facilitate movement of the first and second spit support members between their respective storage and use positions.

3. The barbecue in accordance with claim 1, wherein the first and second spit support members are settable at three use positions, in which they partially protrude from the barbecue body by three varying amounts respectively.

4. The barbecue according to claim 1, wherein the barbecue body includes a storage compartment.

5. The barbecue according to claim 4, wherein the barbecue body includes one or more storage doors to provide access to the storage compartment.

6. The barbecue according to claim 1, wherein the barbecue body includes a grill area adapted to receive charcoal or firewood.

7. The barbecue according to claim 6, wherein the grill area includes a grill interior and a grill rack.

8. The barbecue according to claim 1, wherein the barbecue body includes a plurality of ventilation slots.

9. The barbecue according to claim 1, further including a plurality of legs to support the barbecue body.

* * * * *